United States Patent
Kikuchi (10) Patent No.: US 6,544,635 B2
(45) Date of Patent: Apr. 8, 2003

(54) MAGNETIC RECORDING MEDIUM

(75) Inventor: Kenichi Kikuchi, Mito (JP)

(73) Assignee: Victor Company of Japan, Limited, Yokohama (JP)

( * ) Notice: Subject to any disclaimer, the term of this patent is extended or adjusted under 35 U.S.C. 154(b) by 38 days.

(21) Appl. No.: 09/954,045

(22) Filed: Sep. 18, 2001

(65) Prior Publication Data

US 2002/0061422 A1 May 23, 2002

(30) Foreign Application Priority Data

Sep. 18, 2000 (JP) ........................................ 2000-281439
Jun. 26, 2001 (JP) ........................................ 2001-192554

(51) Int. Cl.[7] .............................................. G11B 5/735
(52) U.S. Cl. ................. 428/216; 428/323; 428/694 BB
(58) Field of Search .......................... 428/216, 694 BB, 428/323

(56) References Cited

U.S. PATENT DOCUMENTS

| | | | |
|---|---|---|---|
| 5,419,943 A | 5/1995 | Meguro et al. | |
| 5,455,112 A | 10/1995 | Inaba et al. | |
| 5,514,464 A | 5/1996 | Sasaki et al. | |
| 5,783,296 A | * 7/1998 | Tamazaki et al. | ............ 428/216 |
| 5,827,599 A | * 10/1998 | Murao et al. | ................ 428/141 |

FOREIGN PATENT DOCUMENTS

| | | |
|---|---|---|
| EP | 0778308 | 6/1997 |
| JP | 56-11624 | 2/1981 |
| JP | 59-172158 | 9/1984 |
| JP | 62-62424 | 3/1987 |
| JP | 63-298810 | 12/1988 |
| JP | 6-215350 | 8/1994 |
| JP | 10-21524 | 1/1998 |
| JP | 10-162349 | 6/1998 |
| JP | 2831101 | 9/1998 |
| JP | 10-231371 | 9/1998 |
| JP | 11-273053 | 10/1999 |

* cited by examiner

Primary Examiner—Stevan A. Resan
(74) Attorney, Agent, or Firm—Connolly Bove Lodge & Hutz LLP (57) ABSTRACT

By designating a Young's modulus in the traverse direction (TD) of a non-magnetic substrate (base film) to be more than 15.6 GN/m$^2$ and less than 19.6 GN/m$^2$, a tape damage, which is possibly given to a magnetic tape while the magnetic tape is running, can be reduced. Accordingly, a magnetic tape, which can maintain an excellent condition of a head contact with the magnetic tape, is provided.

5 Claims, 4 Drawing Sheets

MAGNETIC RECORDING MEDIUM

BACKGROUND OF THE INVENTION

1. Field of the Invention

The present invention relates to a magnetic recording medium, which is formed with a magnetic layer including resin coated on one surface of a non-magnetic substrate (base film), and particularly relates to a magnetic recording medium being able to realize excellent magnetic characteristics if it is utilized for digital recording, which demands high density recording.

2. Description of the Related Art

In a magnetic tape as a magnetic recording medium used for a video tape recorder (referred to as VTR), hereinafter a magnetic recording medium is generically referred to a magnetic tape, a thickness of magnetic tape is necessary to be as thin as possible in order to extend a recording time. However, if the thickness itself is simply thinned, a mechanical strength of magnetic tape is deteriorated. The deteriorated mechanical strength causes problems such that an electromagnetic conversion characteristic is deteriorated by a worse contacting condition of the magnetic tape with a magnetic head, and such that the magnetic tape may be damaged, folded or wrinkled by a collision of the magnetic tape with a tape guide, which regulates tape traveling.

In order to solve the problems mentioned above, several countermeasures have been tried such as reinforcing polyester film utilized for a non-magnetic substrate supporting a magnetic layer and improving a mechanical strength of magnetic tape by forming a magnetic layer having a higher modulus of elasticity. However, result of improvement with respect to the above-mentioned problems was unsatisfactory. Therefore, there provided several prior arts, for example, the Japanese Patent Application Laid-open Publications No. 56-11624/1981 and No. 62-62424/1987 disclose that aramid resin is utilized for a non-magnetic substrate, No. 63-298810/1988 discloses that the Young's modulus in the transverse direction (hereinafter referred to TD) of a substrate is designated to be larger than the Young's modulus in the longitudinal direction (hereinafter referred to MD), wherein the Young's modulus in the TD and MD is referred to the TD Young's modulus and the MD Young's modulus respectively, and No. 4-44628/1992 discloses that the TD and MD Young's moduli are set to approximately 7.8 GN/m$^2$ respectively.

Further, in accordance with a shift of signal system for recording and reproducing by a VTR from analog over to digital, With respect to a magnetic tape in the future, a demand for extending a recording time of a magnetic tape in the future is increasing in a digital format as same manner as in an analog format. However, no actual suggestion for realizing the extension of recording time has been provided.

In a magnetic tape of the prior art mentioned above, such a configuration utilizing an aramid resin film as a non-magnetic substrate generates a problem such that a manufacturing cost of the aramid resin film is expensive and the aramid resin film is hard to utilize commonly because the aramid resin film is inferior in productivity.

Further, in a conventional magnetic tape, an optimum contacting condition of the magnetic tape with a magnetic head can not be maintained, so that an electromagnetic conversion characteristic between the magnetic tape and the magnetic head is deteriorated in accordance with that a total thickness of the magnetic tape becomes thinner even though the TD Young's modulus of a non-magnetic substrate is constituted to be more than the MD Young's modulus. Thus, there existed another problem such that a longer recording time of a VTR is hard to be realized by thinning a thickness of the magnetic tape. The total thickness of a magnetic tape mentioned above is a thickness of the magnetic tape in total, for example, the total thickness is a thickness of a back coating layer, a non-magnetic substrate (base film) and a magnetic layer laminated in sequence.

Furthermore, in a conventional magnetic tape, both of the above-mentioned electromagnetic conversion characteristic and a mechanical strength of magnetic tape are deteriorated if the total thickness becomes less than 14 μm even though the TD and MD Young's moduli are constituted to be approximately 7.8 GN/m$^2$. Consequently, there existed a further problem such that a longer recording time of a VTR is hard to be realized by thinning a thickness of the magnetic tape.

Moreover, in a magnetic tape utilized for recording a digital signal, a physical condition to be observed while recording or reproducing such as a space loss, which is a distance between a magnetic recording medium (magnetic tape) and a magnetic head, is required more strictly. Therefore, there existed a furthermore problem such that a conventional magnetic recording medium can hardly improve a reproduction output or characteristics of error and a microscopic dropout (D/O) of −6 dB and 0.5 μs. The D/O is a phenomenon that a level of reproduction output of magnetic tape decreases intermittently, wherein the reproduction output is essentially outputted continuously. The "−6 dB and 0.5 μs" represents that a state of signal is counted as a dropout (D/O), wherein a signal output decreases by more than 6 dB with respect to an original signal level and such a signal output condition continues for a period of more than 0.5 μs.

In a VTR of the VHS system as a conventional video tape recorder of the analog format, a conspicuous D/O on a screen is regulated as −16 to −20 dB and 5 to 15 μs. However, in a case that a signal to be recorded is changed from analog over to digital, an error rate of digital reproduction signal is influenced by a microscopic D/O of signal. Thus, a minute D/O such as −6 dB and 0.5 μs should be reduced. A D/O of −6 dB and 0.5 μs is small in signal reduction to be regulated in comparison with a criterion of measurement of conventional D/O such as −16 to −20 dB and 5 to 15 μs, so that the smaller dropout is called a microscopic D/O.

SUMMARY OF THE INVENTION

Accordingly, in consideration of the above-mentioned problems of the prior arts, an object of the present invention is to provide a magnetic recording medium, which is excellent in an electromagnetic conversion characteristic and exhibits excellent characteristics such that an error rate is decreased even when recording or reproducing a digital signal and a microscopic D/O (dropout) is decreased by reducing occurrence of possible damage to the magnetic recording medium while running and keeping mechanical contact of the magnetic recording medium with a magnetic head in an excellent condition even though a total thickness of the magnetic recording medium is thinner than the standard in order to realize a longer period of recording time of a signal.

In order to achieve the above object, the present invention provides, according to an aspect thereof, a magnetic recording medium comprising: a tape shaped non-magnetic substrate; and a magnetic layer formed by coating magnetic powder and resin mixed and dispersed on one surface of the non-magnetic substrate, the magnetic recording medium is further characterized in that a total thickness of the magnetic recording medium is within a range of more than 9.0 μm and less than 12.3 μm, and that a thickness of the magnetic layer is within a range of more than 1.3 μm and less than 2.0 μm, and that a Young's modulus in the traverse direction (TD) of the non-magnetic substrate is within a range of more than 15.6 $GN/m^2$ and less than 19.6 $GN/m^2$.

Other object and further features of the present invention will be apparent from the following detailed description when read in conjunction with the accompanied drawings.

DETAILED DESCRIPTION OF THE PREFERRED EMBODIMENTS

Prior to describing each embodiment, an essential configuration of a magnetic recording medium and a term common to each embodiment is depicted first.

A magnetic recording medium according to the present invention is a magnetic tape having a configuration of three layers composed of a back coating layer, a non-magnetic substrate (base film), and a magnetic layer, which are laminated in sequence and constitute a total thickness of the magnetic tape. Hereinafter a magnetic recording medium of the present invention is generically referred to a magnetic tape.

The Young's modulus explained in each embodiment is exhibited by a value, which is obtained from a stress at 0.5% of stretch by using a universal tensile tester. Further, a thickness represents a thickness in a dried condition unless otherwise specified.

According to a study of mechanical characteristic of magnetic tape, following fact is found. A strength of magnetic tape in a longitudinal direction is sufficient if it is a predetermined degree of strength at a position where a deformation amount is low, wherein the longitudinal direction is also called a tape running direction or MD. On the other hand, it is necessary for a strength in a transverse direction to be a higher strength at a position where a deformation amount is relatively high in conjunction with a strength at a position where a deformation amount is low, wherein the transverse direction is a direction intersecting at right angles with the tape running direction (MD) and abbreviated as TD. The above-mentioned positions where a deformation amount is low or relatively high are detailed next.

Essentially, a magnetic tape receives a deformation in the order of micron when a magnetic head provided on a rotary drum installed in a VTR is sliding on the magnetic tape. The position where a deformation amount is low indicates a position deformed by such a deformation by a magnetic head. The deformation is recovered in a short period of time. Therefore, a strength at the position where a deformation amount is low is a force bouncing such a low deformation amount in a short period of time. It is qualitatively apparent that a strength becomes higher if the Yong's modulus is higher.

On the other hand, the position where a deformation amount is high is a part of magnetic tape receiving an action of force such as folding and is deformed by a force received from a tape guide or like while the magnetic tape is running in a relatively low speed. The position is affected by the force during a relatively longer period of time. A magnetic tape is damaged due to a deformation, which does not recover, if the magnetic tape is hard and fragile. Therefore, it is important for the magnetic tape to have not only a higher Young's modulus but also some degree of flexibility.

A magnetic tape such that a total thickness is thinner and a TD Young's modulus of a non-magnetic substrate is less than 15.6 $GN/m^2$ can hardly ensure a running reliability equivalent to a currently available magnetic tape having a thicker total thickness due to a stress between the magnetic tape and a flange material of a running position regulating guide, which regulates a running of the magnetic tape. Further, an edge in the transverse direction (TD) of the magnetic tape may be mechanically damaged, that is, a slight edge damage may occur, and a contact of the magnetic tape with a magnetic head is deteriorated. Accordingly, there existed a possibility such that an output of video signal may be deteriorated and an output of audio signal may also be deteriorated. In a case that the output of video or audio signal is extremely deteriorated, it is possible to happen that a noise may appear on a screen or defective synchronization and a dropout (D/O) of sound may occur.

According to a study of the above-mentioned defect, a cause of the defect is as follows: a magnetic layer is a film containing magnetic powder excessively, so that the film is lack in flexibility. On the other hand, a non-magnetic substrate is made by a material of polymer, so that the non-magnetic substrate has a characteristic of being rich in flexibility.

In a conventional magnetic tape having a thicker total thickness, since a thickness of the non-magnetic substrate is rather thicker with respect to the total thickness, the conventional magnetic tape is totally high in elasticity and flexibility. Therefore, the above-mentioned defect seldom occurs in the conventional magnetic tape having a thicker total thickness. However, in a thinner magnetic tape utilized for recording for a long period of time, it is considered that elasticity and flexibility of the thinner magnetic tape is totally decreased because of lowering of a thickness ratio of the non-magnetic substrate with respect to the total thickness.

In order to prevent the above-mentioned defect possibly occurring in a thinner magnetic tape, it is necessary for the thinner magnetic tape to increase a strength of a non-magnetic substrate so as to ensure desired elasticity and flexibility. It is found that a contact of the magnetic tape with a magnetic head is not improved if a TD Young's modulus of a non-magnetic substrate does not reach 15.6 $GN/m^2$. Particularly, in a case of a digital recording system, increasing a reproduction output is required to ensure a sufficient output due to a higher track density of recording medium. In order to increase the reproduction output, it is important to reduce an alienation distance between a magnetic tape and a magnetic head, that is, a space loss, which happens when recording or reproducing a signal. Therefore, a head contact with a magnetic tape is a most important factor for increasing a reproduction output.

In a case that a space loss occurs due to a deteriorated head contact and a reproduction output is insufficient, a reproduction error of signal is generated and a block noise appears on a screen such as a television monitor. Further, if the reproduction error is remarkable, a picture on a screen may disappear. Furthermore, a dropout of sound may occur.

[First Embodiment]

As mentioned above, a magnetic tape according to a first embodiment of the present invention is a magnetic tape having a configuration of three layers composed of a back coating layer, a non-magnetic substrate (base film) and a magnetic layer, which are laminated in sequence and constitute a total thickness of the magnetic tape. The non-magnetic substrate is made by polyester as a main component. Actually, polyethylene naphthalate is more desirable for the non-magnetic substrate. The polyethylene naphthalate is drawn in the longitudinal and transverse directions by a biaxial drawing machine after filming the polyethylene naphthalate, and then a raw material for a non-magnetic substrate is obtained. By optimizing a drawing force while drawing the polyethylene naphthalate, a predetermined Young's modulus can be obtained. A preferable thickness of non-magnetic substrate is 5.4 to 10.4 $\mu$m. If the thickness is thinner than 5.4 $\mu$m, an edge damage increases. If the thickness exceeds 10.4 $\mu$m, a total thickness of the magnetic tape becomes thicker as a result.

With respect to the magnetic layer, any kind of coated type magnetic layer, which is produced by mixing and dispersing ferromagnetic powder and resin, can be utilized for the magnetic layer of the first embodiment of the present invention. However, it is more suitable for the magnetic layer of the first embodiment of the present invention that a MD Young's modulus and a TD Young's modulus of the magnetic layer is within a range of 6.5 to 30.0 $GN/m^2$ and 1.8 to 18.6 $GN/m^2$ respectively. In addition thereto, the above-mentioned 6.5 to 30.0 $GN/m^2$ means $6.5 \times 10^9$ to $30.0 \times 10^9$ $N/m^2$ exactly.

Ferromagnetic powder utilized for the magnetic layer of the first embodiment of the present invention is not limited to one. Any kind of powder having magnetism such as metal magnetic powder, iron oxide, iron carbonate and barium ferrite can be utilized for the magnetic layer of the first embodiment of the present invention. With respect to a shape of ferromagnetic powder, any type of shape such as a ball, an acicular, and a plate can be utilized by selecting arbitrarily.

A reason why the magnetic layer including resin is utilized is for increasing an elastic limit of the magnetic layer so as to improve an edge damage. If the magnetic layer does not include resin such as a thin film recording medium of which magnetic layer is formed by a vacuum deposition method or a sputtering method, an elastic limit of the magnetic layer is deteriorated and a defect such as an edge damage can not be improved.

Further, resin utilized for the magnetic layer is not limited to one. Any kinds of resin, which can disperse magnetic powder and satisfies a function as a magnetic layer, can be utilized. Furthermore, with respect to an inorganic material added to the non-magnetic substrate and magnetic layer, a material generally available can be utilized.

More, in the magnetic tape of the first embodiment, it is desirable to be provided with a back coating layer. A Young's modulus in the longitudinal direction or an MD Young's modulus of the back coating layer is desirable to be 11 to 38 $GN/m^2$. If the MD Yong's modulus is less than 11 $GN/m^2$, an edge damage increases. If the MD Yong's modulus exceeds 38 $GN/m^2$, a head contact with the magnetic tape is deteriorated. The desirable Yong's modulus can be realized by containing plate shaped powder in the back coating layer and by considering resin composition.

Moreover, a thickness of a magnetic layer or a back coating layer explained in this first embodiment is a thickness as a recording medium. In a case that a process such as the well-known art of calendering is provided for manufacturing a magnetic tape, the thickness represents a thickness after the calendering process is completed. With respect to a manufacturing method of magnetic layer, a coating method, an orienting method and a cutting method, they are not limited to one specific method.

A thickness of magnetic layer is desirable to be within a range from 1.3 to 2.0 $\mu$m. If the thickness is less than 1.3 $\mu$m, a head contact with the magnetic tape is deteriorated. A thickness of back coating layer is desirable to be within a range from 1.1 to 2.5 $\mu$m. If the thickness is less than 1.1 $\mu$m, an edge damage increases.

In the magnetic tape of the first embodiment, by using a material having higher strength or a high Young's modulus for a non-magnetic substrate, a tape damage is decreased and a head contact with the magnetic tape is improved. Accordingly, an electromagnetic conversion characteristic and an audio characteristic can be improved. In addition thereto, a microscopic D/O and an error necessary to a digital recording can be improved.

An actual construction of the magnetic tape according to the first embodiment is depicted next.

In this first embodiment, components of magnetic paint shown in Table 1 for a magnetic layer are sufficiently mixed and kneaded and dispersed by using a equipment such as a roll mill, a kneader, and a bead mill. Then, the magnetic paint is coated on a non-magnetic substrate having a strength (Yong's modulus) and a thickness shown in Table 4 in a predetermined thickness shown in Table 4. Magnetic tapes of embodiments 1 through 6 are constructed as a thin magnetic tape for recording for a longer period of time respectively, so that a total thickness of magnetic tape is more than 9.0 μm and less than 12.3 μm and a thickness of magnetic layer is more than 1.3 μm and less than 2.0 μm.

In Table 4, the magnetic tapes of embodiments 1 through 6 vary in a TD Young's modulus of non-magnetic substrate. Further, magnetic tapes according to the prior arts are exhibited in Table 4 as comparative examples (abbreviated as comp. example in Table 4) 1 through 6.

Furthermore, components of back layer of either a ceramic back layer of which components are shown in Table 2 or a carbon back layer of which components are shown in Table 3 is dispersed and coated on the non-magnetic substrate opposite surface to a magnetic layer. A thickness shown in Table 4 is a thickness after the calendering process is completed. After coating the components of back layer, the calendering process is performed and the coated non-magnetic substrate is cut in a tape shape of 12.65 mm wide, and then the magnetic tape is installed in a tape cassette for a video cassette tape.

TABLE 1

| Components of magnetic paint | weight-part |
|---|---|
| Ferromagnetic iron oxide powder (BET 50 m²/g) | 100 |
| Vinyl chloride copolymer (MR110 by Japan Zeon Co.) | 10 |

TABLE 1-continued

| Components of magnetic paint | weight-part |
|---|---|
| Polyurethane resin (UR-8300 by Toyobo Co.) | 10 |
| Polyisocyanate (Colonate L by Japan Polyurethane) | 5 |
| α-alumina (average particle diameter: 0.3 μm) | 6 |
| Myristic acid | 1 |
| Butylstearate | 1 |
| Methyl ethyl keton | 100 |
| Cyclohexanone | 100 |
| Toluene | 50 |

TABLE 2

| Components of back layer (ceramic back layer) | weight-part |
|---|---|
| Plate shaped α-iron oxide (particle diameter: 2 μm, 0.1 μm thick) | 100 |
| Carbon black (average primary particle diameter: 200 nm) | 5 |
| Nitrocellulose | 5.25 |
| Vinyl chloride copolymer (MR110 by Japan Zeon Co.) | 0.25 |
| Polyurethane resin (UR-8200 by Toyobo Co.) | 4 |
| Polyisocyanate (Colonate L by Japan Polyurethane) | 10 |
| Methyl ethyl keton | 500 |
| Cyclohexanone | 300 |
| Toluene | 200 |

TABLE 3

| Components of back layer (carbon back layer) | weight-part |
|---|---|
| Carbon black (particle diameter: 22 nm) | 10 |
| Vinyl chloride vinyl acetate copolymer | 10 |
| Toluene | 40 |
| Methyl ethyl keton | 40 |

TABLE 4

| | Young's modulus of substrate [GN/m²] | | Total thickness [μm] | Thickness of magnetic layer [μm] | Thickness of back coating layer [μm] | |
|---|---|---|---|---|---|---|
| Magnetic tape | TD | MD | | | ceramic | Carbon |
| Embodiment 1 | 19.6 | 3.9 | 11.0 | 1.7 | | 0.8 |
| Embodiment 2 | 19.4 | 8.6 | 9.0 | 1.5 | 1.0 | |
| Embodiment 3 | 15.7 | 4.4 | 11.5 | 1.7 | | 0.8 |
| Embodiment 4 | 15.6 | 9.8 | 9.5 | 1.5 | 1.0 | |
| Embodiment 5 | 18.1 | 6.9 | 12.3 | 2.0 | | 0.8 |
| Embodiment 6 | 17.2 | 7.8 | 11.3 | 1.3 | 1.5 | |
| Comp. example 1 | 15.2 | 3.9 | 11.3 | 1.8 | 1.0 | |
| Comp. example 2 | 15.5 | 6.9 | 11.0 | 1.7 | | 0.8 |
| Comp. example 3 | 14.7 | 9.3 | 11.0 | 1.7 | | 0.8 |
| Comp. example 4 | 11.3 | 9.6 | 11.0 | 1.7 | | 0.8 |
| Comp. example 5 | 10.8 | 3.9 | 11.3 | 1.8 | 1.0 | |
| Comp. example 6 | 8.8 | 7.8 | 11.3 | 1.8 | 1.0 | |

A video tape cassette installed with each of magnetic tapes of embodiments 1 through 6 and comparative examples 1 through 6 is evaluated. A result of evaluation is shown in Table 5 below.

considered that a damage of edge can be evaluated by measuring a minimum output fluctuating. The minimum value is a lowest value of a fluctuating output after measuring a reproduction output of audio signal is started.

TABLE 5

| Magnetic tape | Young's modulus of substrate [GN/m$^2$] | | Thickness of substrate [μm] | Error rate | Microscopic D/O (−6 dB 0.5 μs) [pcs.] | Edge damage | Audio output [dB] | RF output [dB] |
|---|---|---|---|---|---|---|---|---|
| | TD | MD | | | | | | |
| Embodiment 1 | 19.6 | 3.9 | 8.5 | 1.4E−05 | 100 | ○ | −0.2 | 0.0 |
| Embodiment 2 | 19.4 | 8.6 | 6.5 | 9.6E−06 | 90 | ○ | −0.3 | 0.0 |
| Embodiment 3 | 15.7 | 4.4 | 9.0 | 2.2E−05 | 160 | ○ | −0.9 | −0.5 |
| Embodiment 4 | 15.6 | 9.8 | 7.0 | 1.1E−05 | 95 | ○ | −0.6 | −0.2 |
| Embodiment 5 | 18.1 | 6.9 | 9.5 | 3.0E−05 | 125 | ○ | −0.4 | −0.4 |
| Embodiment 6 | 17.2 | 7.8 | 8.5 | 3.0E−06 | 60 | ○ | −0.8 | −0.4 |
| Comp. example 1 | 15.2 | 3.9 | 8.5 | 1.1E−04 | 280 | Δ | −1.2 | −1.1 |
| Comp. example 2 | 15.5 | 6.9 | 8.5 | 1.4E−04 | 510 | ○ | −1.0 | −1.0 |
| Comp. example 3 | 14.7 | 9.3 | 8.5 | 1.0E−04 | 300 | ○ | −1.0 | −0.8 |
| Comp. example 4 | 11.3 | 9.6 | 8.5 | 1.8E−04 | 430 | Δ | −1.5 | −0.9 |
| Comp. example 5 | 10.8 | 3.9 | 8.5 | 5.0E−04 | 790 | Δ | −1.9 | −1.6 |
| Comp. example 6 | 8.8 | 7.8 | 8.5 | 1.0E−03 | 1050 | x | −2.4 | −2.2 |

In Table 5, a method of each evaluation is as follows:

1) Error Rate

By using a D-VHS system video deck, model HM-DR10000 manufactured by Victor Company of Japan, Ltd., and a universal counter, model TR5822 manufactured by Advantest, an error for a period of ten minutes is measured and an error rate, which is an occurrence ratio of a reproduction error with respect to a total reproduction signal, is calculated. In Table 5, an error rate of "1.4E−05", for example, represents "$1.4 \times 10^{-5}$".

2) Microscopic D/O (−6 dB 0.5 μs)

A dropout (D/O) is measured by using a VHS system video deck, model BR-7000 manufactured by Victor Company of Japan, Ltd., which is remodeled, and a D/O counter, model VH01CZ improved manufactured by Shibasoku Co.

3) Edge Damage

After loading and unloading a video tape cassette to be measured by using the D-VHS system video deck, model HM-DR10000 manufactured by Victor Company of Japan, Ltd., and further performing the FF (fast forwarding) and REW (rewinding) reproduction in the shuttle search mode, both edges of a magnetic tape are observed visually. By comparing with an initial condition of the magnetic tape, an edge damage is ranked. In a case that there is not existed a noticeable change on tape edges, the edge damage is indicated by a circle mark "○". In a case that a minor damage is noticeable on a tape edge, the edge damage is indicated by a triangle mark "Δ". In a case that there existed a damage on a tape edge, the edge damage is indicated by a cross mark "x".

4) Audio Output

An audio signal of 10 kHz is recorded by using the D-VHS system video deck, model HM-DR10000 manufactured by Victor Company of Japan, Ltd. after loading and unloading a video tape cassette to be measured. A minimum value of signal of which output decreases is defined as an audio output. The audio output mentioned above is measured as an output of audio signal recorded on an edge portion of a magnetic tape. If an edge is damaged, a reproduction output decreases and its output level becomes unstable and fluctuates. If an edge is severely damaged, an output is decreased and severely fluctuated. Therefore, it is 5) RF Output With remodeling a VTR in consideration of a demand for higher output in a digital recording, an output of 9.6 MHz signal, which is recorded and reproduced, is defined as an RF output. A value of RF output shown in Table 5 is a relative value with respect to the RF output of the magnetic tape of the embodiment 1 as the reference level of 0 dB.

According to Table 5, following points (1) through (4) of improvement become apparent.

(1) Since a TD Young's modulus of non-magnetic substrate is designated within the range of predetermined value, an error rate is greatly improved.

Figure 1:
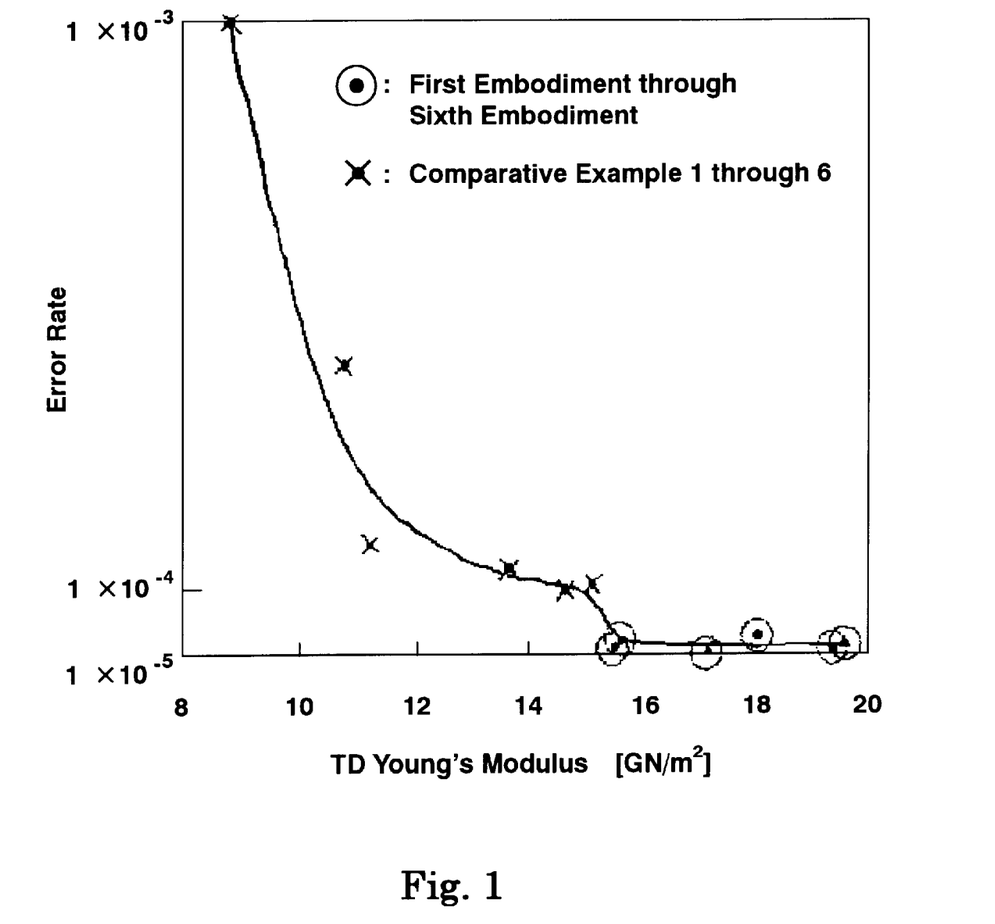
FIG. 1 is a characteristic chart exhibiting a relationship between a TD Young's modulus and an error rate with respect to a non-magnetic substrate in a magnetic recording medium according to preferred embodiments of the present invention.

As shown in Table 5, the TD Young's modulus of the magnetic tapes according to the embodiments 1 through 6 of the present invention is set to the range of more than 15.6 GN/m$^2$ and less than 19.6 GN/m$^2$. Therefore, an error rate of the embodiments 1 through 6 is improved by more than one figure in comparison with the comparative examples 1 through 6. This situation is apparent from FIG. 1, which exhibits a relationship between a TD Young's modulus of non-magnetic substrate and an error rate. As shown in Table 4, only the embodiment 1 exhibits an excellent error rate value even though the embodiment 1 and the comparative examples 2 through 4 have the same values as 11.0 μm of a total thickness and 1.7 μm of a magnetic layer thickness.

(2) Since the TD Young's modulus of non-magnetic substrate of the present invention is assigned to be within the predetermined range, a microscopic D/O is greatly improved.

Figure 2:
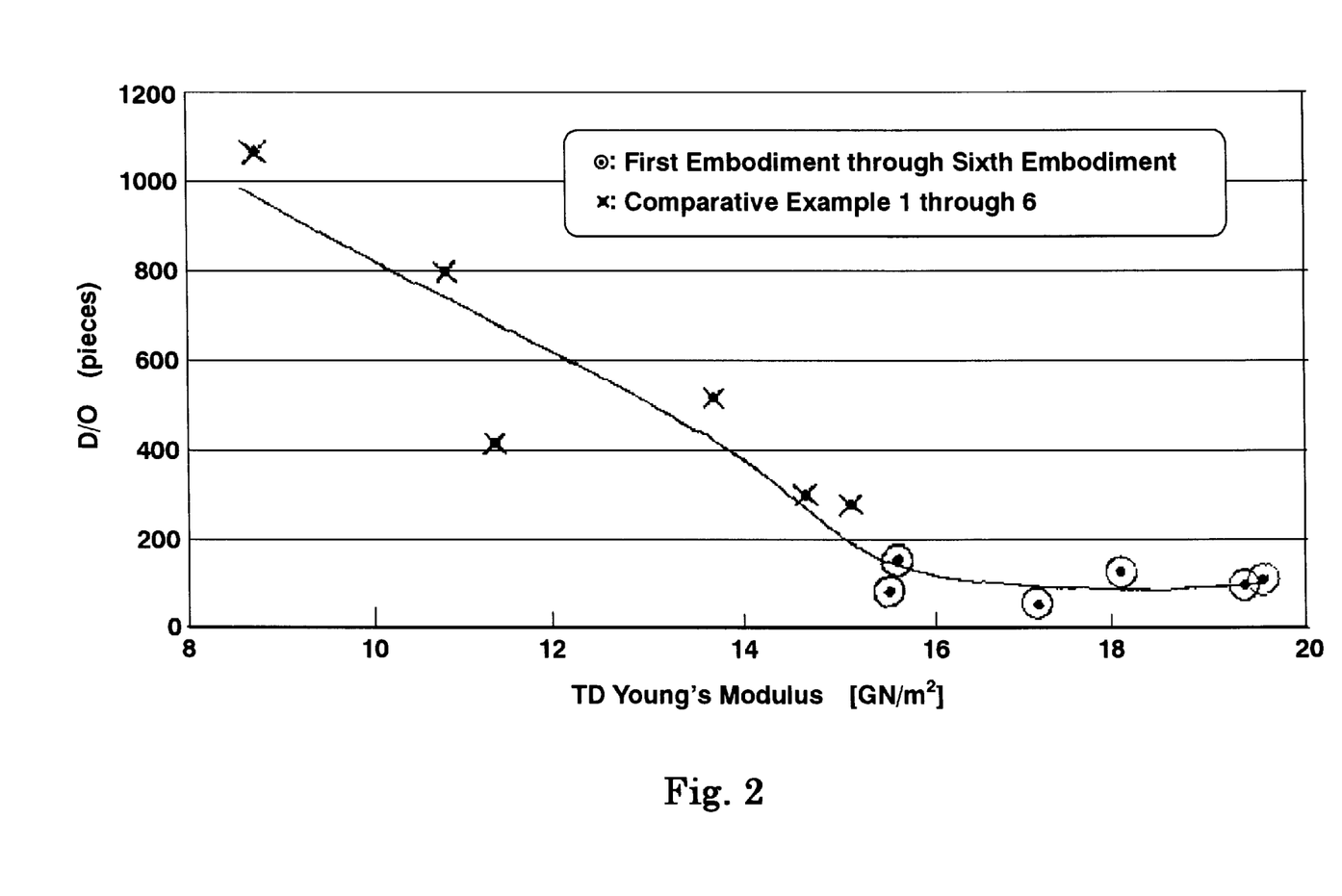
FIG. 2 is a characteristic chart exhibiting a relationship between a TD Young's modulus and a microscopic D/O (dropout) with respect to the non-magnetic substrate in the magnetic recording medium shown in FIG. 1.

This situation is apparent from FIG. 2 exhibiting a relationship between a TD Young's modulus of non-magnetic substrate and a microscopic D/O.

(3) The TD Young's modulus of non-magnetic substrate is designated within the predetermined range, so that a magnetic tape of the present invention can be prevented from edge damage.

This is apparent from Table 5. The TD Young's modulus of the embodiments 1 through 6 is designated within the range of more than 15.6 GN/m$^2$ and less than 19.6 GN/m$^2$, so that edge damage never happens.

(4) The TG Young's modulus of non-magnetic substrate is designated within the predetermined range, so that an audio output and RF output can be greatly improved.

Figure 3:
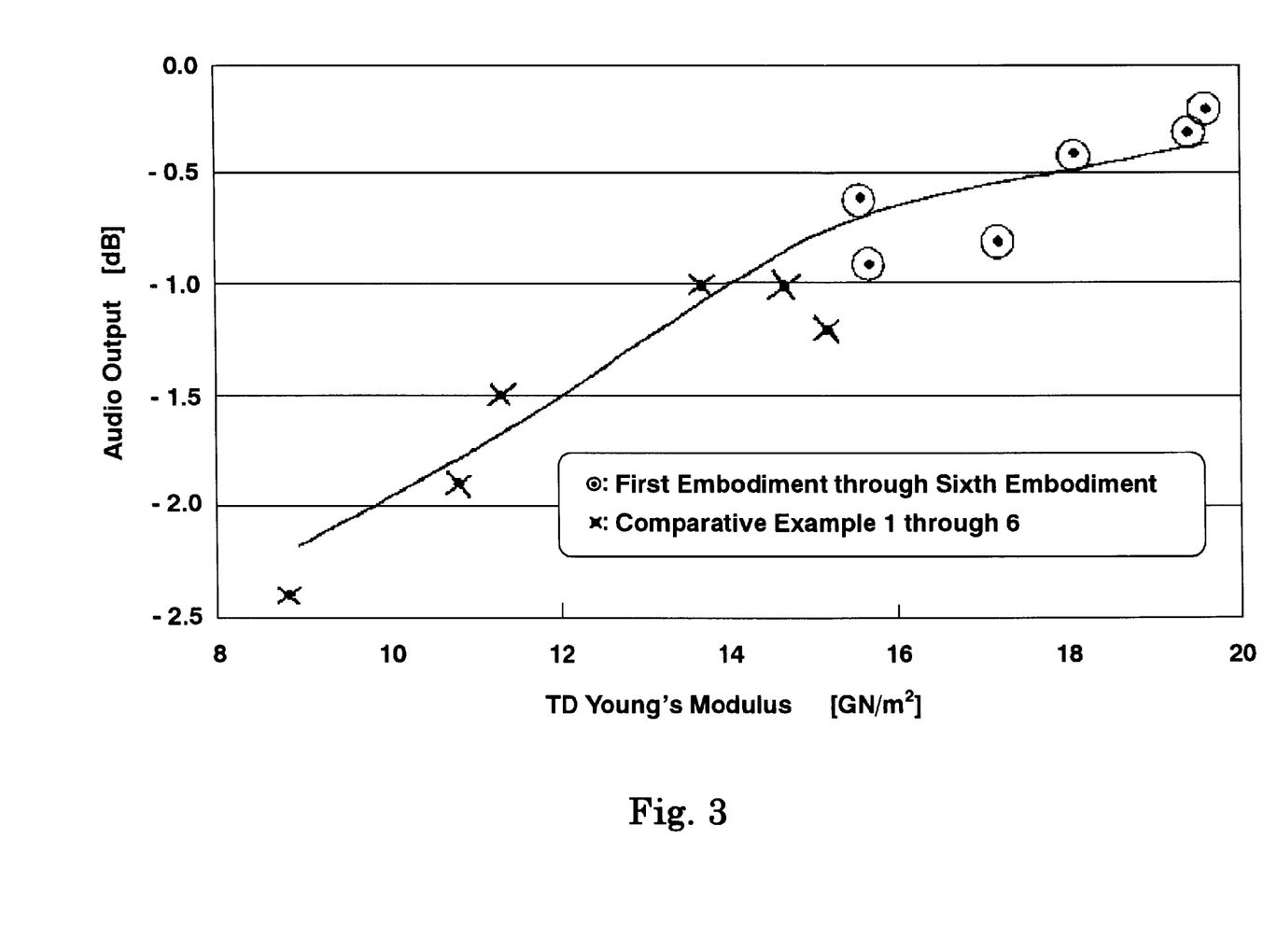
FIG. 3 is a characteristic chart exhibiting a relationship between a TD Young's modulus and an audio output with respect to the non-magnetic substrate in the magnetic recording medium shown in FIG. 1.
Figure 4:
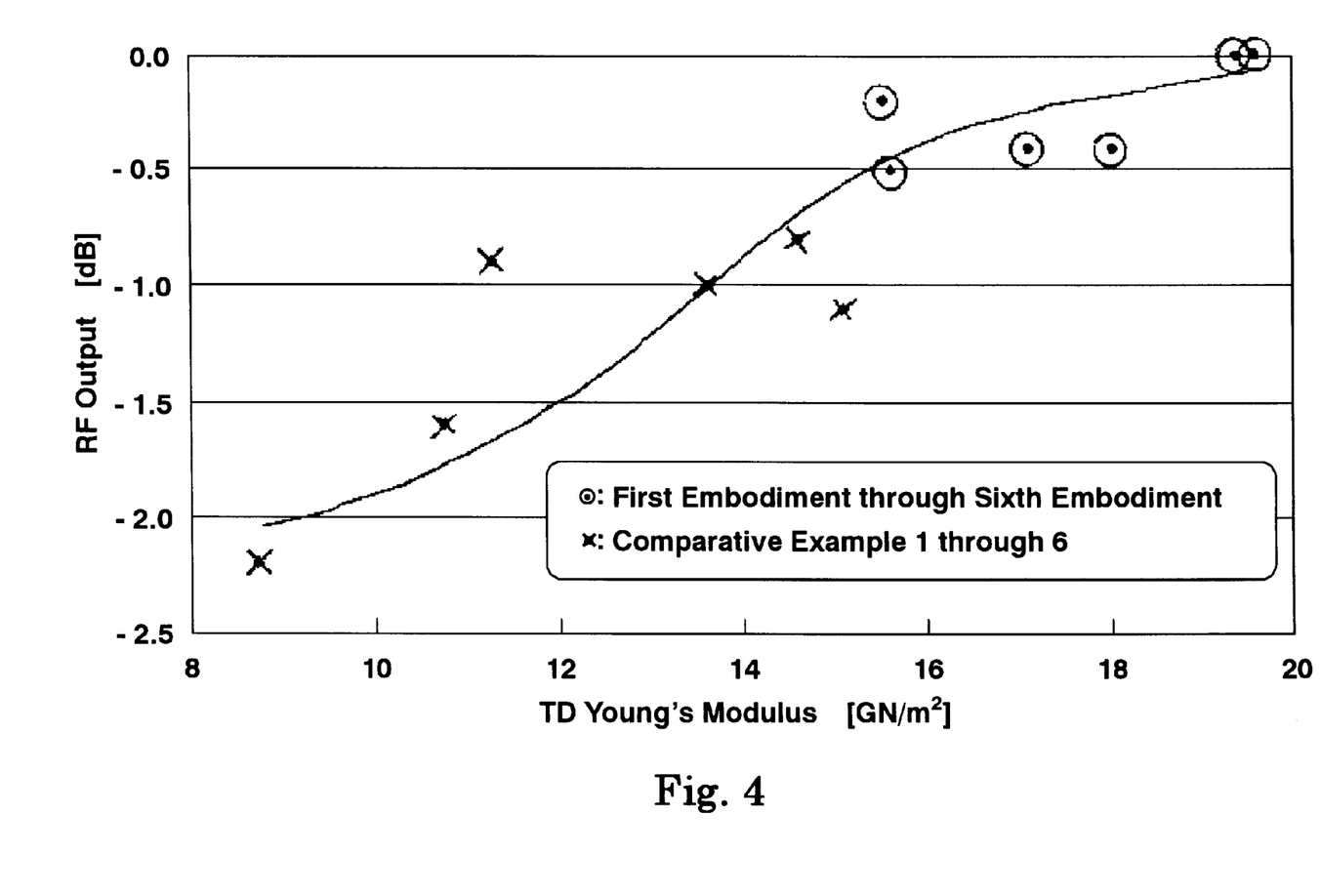
FIG. 4 is a characteristic chart exhibiting a relationship between a TD Young's modulus and an RF output with respect to the non-magnetic substrate in the magnetic recording medium shown in FIG. 1.

This is apparent from FIG. 3, which exhibits a characteristic of audio output with respect to the TD Young's modulus, and FIG. 4, which exhibits a characteristic of RF output with respect to the TD Young's modulus.

In other words, as it is apparent from Table 5, edge damage varies by magnetic tapes according to the comparative examples 1 through 3 of which Young's modulus of non-magnetic substrate is inferior to the predetermined range in comparison with that of the magnetic tapes according to the embodiments 1 through 6 of the present invention. However, an error rate and a microscopic D/O of the magnetic tapes according to the comparative examples 1 through 3 are inferior to those of the magnetic tapes according to the embodiments 1 through 6 apparently. Further, an RF output of the magnetic tapes according to the comparative examples 1 through 3 is deteriorated. It is apparent that the magnetic tapes of comparative examples 1 through 3 are deteriorated in head contact. Accordingly, they must be improved.

Furthermore, in the comparative examples 4 and 5, a value of TD Young's modulus is designated to be approximately a same value. However, a value of MD Young's modulus of the comparative example 4 is designated to be larger than that of the comparative example 5. Edge damage occurs and an excellent result can not be obtained. Accordingly, it is found that changing an MD Young's modulus does not bring any effect of improvement.

With respect to the comparative example 6, a TD and MD Young's moduli are designated to be a relatively lower value and a similar value to each other. An error rate and edge damage is result in a worst case. This exhibits that head contact with the magnetic tape of the comparative example 6 and tape strength is extremely deteriorated. In other words, a magnetic tape having similar values of Young's modulus in the TD and MD can not be improved in head contact or tape strength.

The magnetic tapes according to the embodiments 1 through 6 of the present invention apparently exhibit excellent results in the RF output necessary for a digital recording medium, an error rate and microscopic D/O.

According to the above mentioned magnetic tapes of the present invention, the TD Young's modulus of non-magnetic substrate is designated within the range of more than 15.6 $GN/m^2$ and less than 19.6 $GN/m^2$. The magnetic tapes can be prevented from damage while running although a tape thickness is thinner in accordance with recording for a longer period of time. Further, the magnetic tapes exhibit an excellent electromagnetic conversion characteristic by maintaining excellent head contact with each recording medium (magnetic tape). Furthermore, the magnetic tapes actually exhibit excellent characteristics in an error rate and a microscopic D/O of −6 dB and 0.5 $\mu$m as a digital recording medium.

[Second Embodiment]

According to a study of mechanical characteristic of magnetic tape, following fact is found. A strength of magnetic tape in a longitudinal direction is sufficient if it is a predetermined degree of strength at a position where a deformation amount is low, wherein the longitudinal direction is also called a tape running direction or MD. On the other hand, it is necessary for a strength in a transverse direction to be a higher strength at a position where a deformation amount is relatively high in conjunction with a strength at a position where a deformation amount is low, wherein the transverse direction is a direction intersecting at right angles with the tape running direction (MD) and abbreviated as TD.

The above-mentioned positions where a deformation amount is low or relatively high are detailed next.

Essentially, a magnetic tape receives a deformation in the order of micron when a magnetic head provided on a rotary drum installed in a VTR is sliding on the magnetic tape. The position where a deformation amount is low indicates a position deformed by such a deformation by a magnetic head. The deformation is recovered in a short period of time. Therefore, a strength at the position where a deformation amount is low is a force bouncing such a low deformation amount in a short period of time. It is qualitatively apparent that a strength becomes higher if the Yong's modulus is higher.

On the other hand, the position where a deformation amount is high is a part of magnetic tape receiving an action of force such as folding and is deformed by a force received from a tape guide or like while the magnetic tape is running in a relatively low speed. The position is affected by the force during a relatively longer period of time. A magnetic tape is damaged due to a deformation, which does not recover, if the magnetic tape is hard and fragile. Therefore, it is important for the magnetic tape to have not only a higher Young's modulus but also some degree of flexibility.

A magnetic tape such that a total thickness is thinner and a TD Young's modulus of a non-magnetic substrate is less than 15.6 $GN/m^2$ can hardly ensure a running reliability equivalent to a currently available magnetic tape having a thicker total thickness due to a stress between the magnetic tape and a flange material of a running position regulating guide, which regulates a running of the magnetic tape. Further, an edge in the transverse direction of the magnetic tape may be mechanically damaged, that is, a slight edge damage may occur, and a contact of the magnetic tape with a magnetic head is deteriorated. Accordingly, there existed a possibility such that an output of video signal may be deteriorated and an output of audio signal may also be deteriorated. In a case that the output of video or audio signal is extremely deteriorated, it is possible to happen that a noise may appear on a screen or defective synchronization and a dropout of sound may occur. Further, in a case of a magnetic tape having strength of more than 19.6 $GN/m^2$ in the TD Young's modulus of non-magnetic substrate, edge damage possibly occurs and head contact with the magnetic tape is deteriorated. Accordingly, an audio output and RF output decreases.

Furthermore, running ability in hardware such as a recording and reproducing apparatus is important for a magnetic tape. Particularly, in such a hardware as a VTR provided with a head drum rotating in high speed, a TD Young's modulus affects not only edge damage of a magnetic tape but also head contact with the magnetic tape. With respect to running ability of a magnetic tape, surface roughness and a coefficient of friction on a surface of backside of a magnetic tape extremely affects running ability of the magnetic tape in conjunction with surface roughness and a coefficient of friction on a surface of magnetic layer of the magnetic tape. In order to control running ability of a backside of the magnetic tape, a back coating layer, which is composed of carbon black and resin mainly, is usually provided.

According to a study of the above-mentioned defect such as edge damage and defective head contact with magnetic tape, a cause of the defect is as follows: a magnetic layer is a film containing magnetic powder in excess, so that the film is lack in flexibility. On the other hand, a non-magnetic substrate is made by a material of polymer, so that the non-magnetic substrate has a characteristic of being rich in flexibility.

In a conventional magnetic tape having a thicker total thickness, since a thickness of the non-magnetic substrate is rather thicker with respect to the total thickness, the conventional magnetic tape is totally high in elasticity and flexibility. Therefore, the above-mentioned defect seldom occurs in the conventional magnetic tape having a thicker total thickness. However, in a thinner magnetic tape utilized for recording for a long period of time, it is considered that elasticity and flexibility of the thinner magnetic tape is totally decreased because of lowering of a thickness ratio of the non-magnetic substrate with respect to the total thickness.

In order to prevent the above-mentioned defect possibly occurring in a thinner magnetic tape, it is necessary for the thinner magnetic tape to increase strength of a non-magnetic substrate so as to ensure desired elasticity and flexibility. Consequently, a TD Young's modulus of non-magnetic substrate of a magnetic tape according to the second embodiment of the present invention is designated within a range of more than 15.6 $GN/m^2$ and less than 19.6 $GN/m^2$. Details will be explained.

Further, in a magnetic tape of the second embodiment, it is designated that thickness of a back coating layer is within a range of more than 1.0 $\mu$m and less than 2.5 $\mu$m and a MD young's modulus is within a range of more than 11 $GN/m^2$ and less than 38 $GN/m^2$. By combining a non-magnetic substrate proposed by the second embodiment with the back coating layer, head contact with a magnetic tape and damage to the magnetic tape is favorably improved. Furthermore, by using plate shaped powder for a back coating layer and by selecting resin, a Young's modulus as dynamical strength of a back coating layer and a magnetic tape totally is improved.

Particularly, in a case that a system of signal to be recorded is a digital recording system, increasing reproduction output is required for necessity of ensuring a sufficient output due to higher track density of a recording medium. In order to increase a reproduction output, decreasing a space loss, that is, a distance between a magnetic tape and a magnetic head, which occurs while recording and reproducing a signal, is most important. To decrease a space loss, a head contact with magnetic tape is a most important factor.

If a reproduction output is insufficient due to a bad head contact causing a space loss, a reproduction error of signal may occur and a block noise may appear on a screen such as a television monitor. If a reproduction error is extremely remarkable, a picture on a screen may disappear. Further, dropout of an audio signal may happen.

In consideration of the above-mentioned problems, a magnetic tape according to the second embodiment of the present invention is explained next.

A magnetic tape according to the second embodiment of the present invention is a magnetic tape having a configuration of three layers composed of a back coating layer, a non-magnetic substrate (base film) and a magnetic layer, which are laminated in sequence and constitute a total thickness of the magnetic tape. The non-magnetic substrate is made by polyester as a main component. Actually, polyethylene naphthalate is more desirable for the non-magnetic substrate. The polyethylene naphthalate is drawn in the longitudinal and transverse directions by a biaxial drawing machine after filming the polyethylene naphthalate and then a raw material for a non-magnetic substrate is obtained. By optimizing a drawing force while drawing the polyethylene naphthalate, a predetermined Young's modulus can be obtained. A preferable thickness of non-magnetic substrate is 5.4 to 10.4 $\mu$m. If the thickness is thinner than 5.4 $\mu$m, an edge damage increases. If the thickness exceeds 10.4 $\mu$m, a total thickness of the magnetic tape becomes thicker.

With respect to the magnetic layer, any kind of coated type magnetic layer, which is produced by mixing and dispersing ferromagnetic powder and resin, can be utilized for the magnetic layer of the second embodiment of the present invention. However, it is more suitable for the magnetic layer of the second embodiment of the present invention that a MD Young's modulus and a TD Young's modulus of the magnetic layer is within a range of 6.5 to 30.0 $GN/m^2$ and 1.8 to 18.6 $GN/m^2$ respectively. In addition thereto, the above-mentioned 6.5 to 30.0 $GN/m^2$ means $6.5 \times 10^9$ to $30.0 \times 10^9$ $N/m^2$ exactly.

Further, with respect to coercive force of a magnetic layer, it is preferable for a magnetic tape that coercive force is 30 to 273 kA/m, more preferably to be 70 to 120 kA/m. Furthermore, surface roughness of the magnetic layer is preferable to be 1 to 17 nm, more preferably to be 1 to 12 nm.

Ferromagnetic powder utilized for the magnetic layer of the second embodiment of the present invention is not limited to one. Any kind of powder having magnetism such as metal magnetic powder, iron oxide, iron carbonate and barium ferrite can be utilized for the magnetic layer of the second embodiment of the present invention. With respect to a shape of ferromagnetic powder, any type of shape such as a ball, an acicular and a plate can be utilized by selecting arbitrarily.

A reason why the magnetic layer including resin is utilized is for increasing an elastic limit of the magnetic layer so as to improve an edge damage. If the magnetic layer does not include resin such as a thin film recording medium of which magnetic layer is formed by a vacuum deposition method or a sputtering method, an elastic limit of the magnetic layer is deteriorated and a defect such as an edge damage can not be improved.

Further, a resin utilized for the magnetic layer is not limited to one. Any kinds of resin, which can disperse magnetic powder and satisfies a function as a magnetic layer, can be utilized.

With respect to a resin, there actually provided such resins conventionally well known as thermoplastic resin, thermosetting resin, reactive resin and their mixture. In a case of a thermoplastic resin, there existed a polymer or copolymer including at least one of vinyl chloride, vinyl acetate, vinyl alcohol, maleic acid, acrylate, vinylidene chloride, acrylonitrile, methacrylic acid, methacrylate, styrene, butadiene, ethylene, vinylbutyral, vinyl acetal and vinyl ether as a compositional unit, a polyurethane resin and a rubber family resin. In a case of a thermosetting resin or a reactive resin, there existed phenol resin, epoxy resin, polyurethane curable resin, urea resin, melamine resin, alkyd resin, acrylic family reactive resin, formaldehyde resin, silicon resin, epoxy polyamide resin, mixture of polyester resin and isocyanate prepolymer, mixture of polyester polyol and polyisocyanate and mixture of polyurethane and polyisocyanate. Furthermore, with respect to inorganic matter added to a non-magnetic substrate and a magnetic layer, carbon black, alumina, chromium oxide, calcium carbonate and silicon carbide can be utilized. More, lubricant such as silicone oil, fatty acid, fatty acidic ester, paraffin and phosphoric ester can be utilized for a magnetic layer. Moreover, commonly known additives can be utilized if necessary.

In a magnetic tape according to the second embodiment, a back coating layer is desired to be provided in addition to a non-magnetic substrate and a magnetic layer. An MD Young's modulus of the back coating layer is preferable to be within a range of more than 11 $GN/m^2$ and less than 38 $GN/m^2$. It is caused by that edge damage to the magnetic tape is deteriorated if the MD Young's modulus is less than 11 GN/m², and head contact with the magnetic tape is deteriorated if the MD Young's modulus exceeds 38 GN/m².

The above-mentioned Young's modulus can be realized by including plate shaped powder in a back coating layer and by constituting the back coating layer with considering resin compositions. Actually, such a powder as α-iron oxide and powdered mica having a particle diameter of 0.05 to 3 μm and a aspect ratio of 3 to 100 is suitable for plate shaped powder. Nitrocellulose, copolymer of vinyl chloride and polyurethane resin is suitable for a resin utilized for the back coating layer. A content ratio of resin and plate shaped powder is preferable to be 100 weight-parts of plate shaped powder and 5 to 1000 weight-parts of resin. With respect to a content ratio of resin, it is preferable that 100 weight-parts of copolymer of vinyl chloride, 20 to 5000 weight-parts of nitrocellulose and 15 to 4000 weight-parts of polyurethane resin.

Carbon black is one of non-magnetic powder utilized for a back coating layer other than plate shaped powder. As for a content ratio of carbon black, 0.5 to 100 weight-parts of carbon black is preferable with respect to 100 weight-parts of plate shaped powder. An abrasive and lubricant can be added to a back coating layer if necessary.

A thickness of a magnetic layer and a back coating layer explained in this second embodiment is a thickness as a recording medium. If the calendering process of the prior art is provided for manufacturing a magnetic tape, the thickness represents a thickness after the calendering process is completed. Further, each method of manufacturing, coating and orienting magnetic layer and a cutting method of magnetic tape is not limited to one each method.

Furthermore, a thickness of magnetic layer is preferable to be within a range of more than 1.3 μm and less than 2.0 μm. If the thickness is less than 1.3 μm, a head contact with the magnetic tape is deteriorated. If the thickness exceeds 2.0 μm, a magnetic tape is not preferable due to a deteriorated characteristic.

Moreover, a thickness of back coating layer is preferable to be within a range of more than 1.1 μm and less than 2.5 μm. If the thickness is less than 1.1 μm, edge damage of the magnetic tape increases. I the thickness exceeds 2.5 μm, an error rate and a microscopic D/O is deteriorated.

With respect to a magnetic tape according to the second embodiment, by using a non-magnetic substrate in a higher TD Yong's modulus, tape damage is improved. Further, head contact is improved and an electromagnetic conversion characteristic and an audio characteristic can be improved. Furthermore, a microscopic D/O and error being necessary for a digital recording can be improved.

An actual construction of the magnetic tape according to the second embodiment is depicted next.

In this second embodiment, components of magnetic paint shown in Table 6 for a magnetic layer are sufficiently mixed and kneaded and dispersed by using a equipment such as a roll mill, a kneader and a bead mill. Then, the magnetic paint is coated on a non-magnetic substrate having a strength (Yong's modulus) and a thickness shown in Table 6 in a predetermined thickness shown in Table 6. Magnetic tapes of embodiments 201 through 207 are constructed as a thin magnetic tape for recording for a longer period of time respectively, so that a total thickness of magnetic tape is within a range of more than 9.0 μm and less than 12.3 μm and a thickness of magnetic layer is within a range of more than 1.3 μm and less than 2.0 μm.

TABLE 6

| Magnetic tape | Young's modulus of substrate [GN/m²] TD | Young's modulus of substrate [GN/m²] MD | Total thickness [μm] | Thickness of magnetic layer [μm] | Thickness of back coating layer [μm] | Young's modulus of back coating layer [GN/m²] MD | Paint for back coating layer No. |
|---|---|---|---|---|---|---|---|
| Embodiment 201 | 19.4 | 8.6 | 9.0 | 1.5 | 1.1 | 21 | 1 |
| Embodiment 202 | 15.6 | 9.8 | 9.5 | 1.5 | 1.1 | 19 | 1 |
| Embodiment 203 | 17.2 | 7.8 | 11.3 | 1.3 | 1.5 | 20 | 1 |
| Embodiment 204 | 17.2 | 7.8 | 11.0 | 1.8 | 1.1 | 11.2 | 2 |
| Embodiment 205 | 17.2 | 7.8 | 11.5 | 1.3 | 2.5 | 11.1 | 2 |
| Embodiment 206 | 17.2 | 7.8 | 11.0 | 2.0 | 1.1 | 37.7 | 4 |
| Embodiment 207 | 19.6 | 7.8 | 12.3 | 1.3 | 2.5 | 37.5 | 4 |
| Comp. example 201 | 15.2 | 3.9 | 11.3 | 1.8 | 1.0 | 20.5 | 1 |
| Comp. example 202 | 15.5 | 6.9 | 11.0 | 1.7 | 0.8 | 9.5 | 6 |
| Comp. example 203 | 14.7 | 9.3 | 11.0 | 1.7 | 0.8 | 10.1 | 6 |
| Comp. example 204 | 11.3 | 9.6 | 11.0 | 1.7 | 0.8 | 9.7 | 6 |
| Comp. example 205 | 10.8 | 3.9 | 11.3 | 1.8 | 1.0 | 21.0 | 1 |
| Comp. example 206 | 8.8 | 7.8 | 11.3 | 1.8 | 1.0 | 20.5 | 1 |
| Comp. example 207 | 19.6 | 3.9 | 11.0 | 1.7 | 0.8 | 8.5 | 6 |
| Comp. example 208 | 15.7 | 4.4 | 11.5 | 1.7 | 0.8 | 10 | 6 |
| Comp. example 209 | 18.1 | 6.9 | 12.3 | 2.0 | 0.8 | 9.5 | 6 |
| Comp. example 210 | 17.2 | 7.8 | 11.0 | 1.5 | 0.7 | 22.5 | 1 |
| Comp. example 211 | 17.2 | 7.8 | 11.3 | 1.3 | 1.5 | 8.5 | 3 |
| Comp. example 212 | 17.2 | 7.8 | 12.3 | 1.5 | 3.0 | 20.1 | 1 |
| Comp. example 213 | 17.2 | 7.8 | 11.5 | 1.5 | 1.5 | 40.1 | 5 |
| Comp. example 214 | 19.8 | 3.9 | 11.0 | 2.0 | 1.0 | 20 | 1 |
| Comp. example 215 | 15.6 | 9.8 | 8.0 | 1.3 | 1.0 | 20 | 1 |
| Comp. example 216 | 17.2 | 7.8 | 11.0 | 1.0 | 1.0 | 20.5 | 1 |
| Comp. example 217 | 17.2 | 7.8 | 11.0 | 2.5 | 1.0 | 21 | 1 |

With respect to a total thickness of magnetic tape, a thinner magnetic tape is preferable to be installed in a tape cassette of which dimension is regulated by the format because the thinner magnetic tape can be wound longer in the tape cassette. A thinner magnetic tape proposed by this second embodiment exhibits an excellent performance. However, if a total thickness of magnetic tape is thinner than 9.0 μm, some evaluation items supposed to be important such as a microscopic D/O and edge damage do not exhibit an excellent result.

Further, a magnetic tape of which total thickness exceeds 12.3 μm exhibits a performance without problem practically although the magnetic tape does not comprise a characteristic configuration inherent to the second embodiment. Consequently, there existed no remarkable difference in performance between the prior art and the present invention.

In Table 6, the magnetic tapes of the embodiments 201 through 207 vary in a TD Young's modulus of non-magnetic substrate. Further, magnetic tapes according to the prior arts are exhibited in Table 6 as comparative examples (abbreviated as comp. example in Table 6) 201 through 217.

Furthermore, components of back layer of either a ceramic back layer of which components are shown in Table 8 or a carbon back layer of which components are shown in Table 9 is dispersed and coated on the non-magnetic substrate opposite surface to a magnetic layer. A thickness shown in Table 6 is a thickness after the calendering process is completed. After coating the components of back layer, the calendering process is performed and the coated non-magnetic substrate is cut in a tape shape of 12.65 mm wide, and then the magnetic tape is installed in a tape cassette for a video cassette tape.

Moreover, each of "A" through "D" weight-part shown in Table 8 follows a value shown in Table 10 with respect to each paint number for back coating layer. In addition thereto, paint No. 1 through 5 for a back coating layer shown in Table 8 are corresponding to those shown in Table 10 respectively. Table 9 shows all components of paint No. 6 for a back coating layer.

TABLE 7

| Components of magnetic paint | weight-part |
|---|---|
| Ferromagnetic iron oxide powder (BET 50 m$^2$/g) | 100 |
| Vinyl chloride copolymer (MR110 by Japan Zeon Co.) | 10 |
| Polyurethane resin (UR-8300 by Toyobo Co.) | 10 |
| Polyisocyanate (Colonate L by Japan Polyurethane) | 5 |
| α-alumina (average particle diameter: 0.3 μm) | 6 |
| Myristic acid | 1 |
| Butylstearate | 1 |
| Methyl ethyl keton | 100 |
| Cyclohexanone | 100 |
| Toluene | 50 |

TABLE 8

| Components of back layer (ceramic back layer) Paint No. 1 through 5 in Table 10 | weight-part |
|---|---|
| Plate shape α-iron oxide (particle diameter: shown in Table 10) | 100 |
| Carbon black (average primary particle diameter: 200 nm) | 5 |
| Nitrocellulose | "A" |
| Vinyl chloride copolymer (MR110 by Japan Zeon Co.) | "B" |
| Polyurethane resin (UR-8200 by Toyobo Co.) | "C" |
| Polyisocyanate (Colonate L by Japan Polyurethane) | "D" |
| Methyl ethyl keton | 500 |
| Cyclohexanone | 300 |
| Toluene | 200 |

TABLE 9

| Components of back layer (carbon back layer) Paint No. 6 | weight-part |
|---|---|
| Carbon black (particle diameter: 22 nm) | 10 |
| Vinyl chloride vinyl acetate copolymer | 10 |
| Toluene | 40 |
| Methyl ethyl keton | 40 |

TABLE 10

| Paint No. for back coating layer | Particle diameter of plate shaped powder [μm] | "A" weight-part | "B" weight-part | "C" weight-part | "D" weight-part |
|---|---|---|---|---|---|
| 1 | 1.5 | 10 | 10 | 10 | 5 |
| 2 | 1.0 | 10 | 5 | 15 | 5 |
| 3 | 1.0 | 5 | 5 | 20 | 5 |
| 4 | 2.0 | 12 | 5 | 10 | 7 |
| 5 | 2.5 | 10 | 10 | 5 | 10 |

TABLE 11

| Magnetic tape | Error rate | Microscopic D/O −6 dB, 0.5 μs (pcs.) | Edge damage | Audio output [dB] | RF output [dB] |
|---|---|---|---|---|---|
| Embodiment 201 | 9.6E−06 | 90 | ○ | −0.3 | 0.0 |
| Embodiment 202 | 1.1E−05 | 95 | ○ | −0.6 | −0.2 |
| Embodiment 203 | 3.0E−06 | 60 | ○ | −0.8 | −0.4 |
| Embodiment 204 | 2.0E−06 | 43 | ○ | −0.3 | +0.2 |
| Embodiment 205 | 2.0E−06 | 50 | ○ | −0.2 | 0 |
| Embodiment 206 | 2.0E−06 | 33 | ○ | −0.3 | +0.2 |
| Embodiment 207 | 2.0E−06 | 29 | ○ | −0.1 | +0.3 |
| Comp. example 201 | 1.1E−04 | 280 | Δ | −1.2 | −1.1 |
| Comp. example 202 | 1.4E−04 | 510 | ○ | −1.0 | −1.0 |
| Comp. example 203 | 1.0E−04 | 300 | ○ | −1.0 | −0.8 |
| Comp. example 204 | 1.8E−04 | 430 | Δ | −1.5 | −0.9 |
| Comp. example 205 | 5.0E−04 | 790 | Δ | −1.9 | −1.6 |
| Comp. example 206 | 1.0E−03 | 1050 | x | −2.4 | −2.2 |
| Comp. example 207 | 1.4E−05 | 100 | ○ | −0.2 | 0.0 |
| Comp. example 208 | 2.2E−05 | 160 | ○ | −0.9 | −0.5 |
| Comp. example 209 | 3.0E−05 | 125 | ○ | −0.4 | −0.4 |
| Comp. example 210 | 1.0E−04 | 290 | Δ | −2.5 | −1.3 |
| Comp. example 211 | 2.0E−04 | 620 | Δ | −1.1 | −1.1 |
| Comp. example 212 | 1.0E−04 | 410 | ○ | −0.1 | −0.7 |
| Comp. example 213 | 1.0E−02 | 2050 | x | −1.0 | −3.0 |
| Comp. example 214 | 1.0E−03 | 1350 | x | −1.2 | −2.1 |
| Comp. example 215 | 1.0E−02 | 4100 | x | −2.8 | −3.5 |
| Comp. example 216 | 8.3E−05 | 170 | Δ | −1.3 | −1.2 |
| Comp. example 217 | 5.0E−04 | 820 | Δ | −1.5 | −2.0 |

A video tape cassette installed with each of magnetic tapes of embodiments 201 through 207 and comparative examples 201 through 217 shown in Table 6 is evaluated. A result of evaluation is shown in Table 11 above.

In Table 11, a method of each evaluation is as follows:

1) Error Rate

By using a D-VHS system video deck, model HM-DR10000 manufactured by Victor Company of Japan, Ltd., and a universal counter, model TR5822 manufactured by Advantest, an error for a period of ten minutes is measured and an error rate, which is an occurrence ratio of a reproduction error with respect to a total reproduction signal, is calculated. In Table 11, an error rate of "9.6E−06", for example, represents "9.6×10$^{-6}$".

2) Microscopic D/O (−6 dB 0.5 μs)

A D/O (dropout) is measured by using a VHS system video deck, model BR-7000 manufactured by Victor Company of Japan, Ltd., which is remodeled, and a D/O counter, model VH01CZ improved manufactured by Shibasoku Co.

3) Edge Damage

After loading and unloading a video tape cassette to be measured by using the D-VHS system video deck, model HM-DR10000 manufactured by Victor Company of Japan, Ltd., and further performing the FF (fast forwarding) and REW (rewinding) reproduction in the shuttle search mode, both edges of a magnetic tape are observed visually. By comparing with an initial condition of the magnetic tape, an edge damage is ranked. In a case that there is not existed a noticeable change on a tape edge, the edge damage is indicated by a circle mark "○". In a case that a minor damage is noticeable on a tape edge, the edge damage is indicated by a triangle mark "Δ". In a case that there existed a damage on a tape edge, the edge damage is indicated by a cross mark "×".

4) Audio Output

An audio signal of 10 kHz is recorded by using the D-VHS system video deck, model HM-DR10000 manufactured by Victor Company of Japan, Ltd. after loading and unloading a video tape cassette to be measured. A minimum value of signal of which output decreases is defined as an audio output. The audio output mentioned above is measured as an output of audio signal recorded on an edge portion of a magnetic tape. If an edge is damaged, a reproduction output decreases and its output level becomes unstable and fluctuates. If an edge is severely damaged, an output is decreased and severely fluctuates. Therefore, it is considered that a damage of edge can be evaluated by measuring a minimum output fluctuating. The minimum value is a lowest value of a fluctuating output after measuring a reproduction output of audio signal is started.

5) RF Output

With remodeling a VTR and considering a demand for higher output in a digital recording, an output of 9.6 MHz signal, which is recorded and reproduced, is defined as an RF output. A value of RF output shown in Table 11 is a relative value with respect to the RF output of the magnetic tape of the embodiment 201 as the reference level of 0 dB.

The characteristic configuration of the magnetic tape of the second embodiment shown in Table 6 and a characteristic point of improvement of the second embodiment revealed from the evaluation result of the magnetic tape according to the second embodiment shown in Table 11 is explained next.

The magnetic tape of the second embodiment shown in Table 6 is constituted so as to satisfy a following condition "P".

The condition "P" shall satisfy all conditions "Q" through "U" totally, wherein the conditions "Q" through "U" are as follows.

Condition "Q": a TD Young's modulus of non-magnetic substrate shall be within a range of more than 15.6 GN/m$^2$ and less than 19.6 GN/m$^2$.

Condition "R": a total thickness of magnetic tape shall be within a range of more than 9.0 μm and less than 12.3 μm.

Condition "S": a thickness of magnetic layer shall be within a range of more than 1.3 μm and less than 2.0 μm.

Condition "T": a thickness of back coating layer shall be within a range of more than 1.1 μm and less than 2.5 μm.

Condition "U": a MD Young's modulus of back coating layer shall be within a range of more than 11 GN/m$^2$ and less than 38 GN/m$^2$.

On the other hand, all the comparative examples 201 through 217 shown in Table 6 do not satisfy the above-mentioned condition "P" at all. In other words, they do not satisfy at least one of the conditions "Q" through "U".

As mentioned above, Table 12 shown below is provided for easier understanding of constitutional differences between the second embodiment of the present invention and the prior arts or the comparative examples 201 through 217. Table 12 exhibits whether or not a magnetic tape satisfies the conditions "P" through "U" with adding a circle mark "○" or a cross mark "×" in adjacent to each of data shown in Table 6. The circle mark "○" represents that a magnetic tape satisfies a condition and the cross mark "×" represent that the magnetic tape does not satisfy the condition.

TABLE 12

| Magnetic tape | Young's modulus of substrate [GN/m$^2$] | | | Total thickness | | Thickness of magnetic layer [μm] "S" | | Thickness of back coating layer [μm] "T" | | Young's modulus of back coating layer [GN/m$^2$] "U" | | "P" |
|---|---|---|---|---|---|---|---|---|---|---|---|---|
| | TD "Q" | | MD | | [μm] "R" | | | | | | | |
| Embodiment 201 | ○ | 19.4 | 8.6 | ○ | 9.0 | ○ | 1.5 | ○ | 1.1 | ○ | 21 | ○ |
| Embodiment 202 | ○ | 15.6 | 9.8 | ○ | 9.5 | ○ | 1.5 | ○ | 1.1 | ○ | 19 | ○ |
| Embodiment 203 | ○ | 17.2 | 7.8 | ○ | 11.3 | ○ | 1.3 | ○ | 1.5 | ○ | 20 | ○ |
| Embodiment 204 | ○ | 17.2 | 7.8 | ○ | 11.0 | ○ | 1.8 | ○ | 1.1 | ○ | 11.2 | ○ |
| Embodiment 205 | ○ | 17.2 | 7.8 | ○ | 11.5 | ○ | 1.3 | ○ | 2.5 | ○ | 11.1 | ○ |
| Embodiment 206 | ○ | 17.2 | 7.8 | ○ | 11.0 | ○ | 2.0 | ○ | 1.1 | ○ | 37.7 | ○ |
| Embodiment 207 | ○ | 19.6 | 7.8 | ○ | 12.3 | ○ | 1.3 | ○ | 2.5 | ○ | 37.5 | ○ |
| Comp. example 201 | × | 15.2 | 3.9 | ○ | 11.3 | ○ | 1.8 | × | 1.0 | ○ | 20.5 | × |
| Comp. example 202 | × | 15.5 | 6.9 | ○ | 11.0 | ○ | 1.7 | × | 0.8 | × | 9.5 | × |
| Comp. example 203 | × | 14.7 | 9.3 | ○ | 11.0 | ○ | 1.7 | × | 0.8 | × | 10.1 | × |
| Comp. example 204 | × | 11.3 | 9.6 | ○ | 11.0 | ○ | 1.7 | × | 0.8 | × | 9.7 | × |
| Comp. example 205 | × | 10.8 | 3.9 | ○ | 11.3 | ○ | 1.8 | × | 1.0 | ○ | 21.0 | × |
| Comp. example 206 | × | 8.8 | 7.8 | ○ | 11.3 | ○ | 1.8 | × | 1.0 | ○ | 20.5 | × |
| Comp. example 207 | ○ | 19.6 | 3.9 | ○ | 11.0 | ○ | 1.7 | × | 0.8 | × | 8.5 | × |
| Comp. example 208 | ○ | 15.7 | 4.4 | ○ | 11.5 | ○ | 1.7 | × | 0.8 | × | 1.0 | × |
| Comp. example 209 | ○ | 18.1 | 6.9 | ○ | 12.3 | ○ | 2.0 | × | 0.8 | × | 9.5 | × |

TABLE 12-continued

| Magnetic tape | Young's modulus of substrate [GN/m²] TD "Q" | | MD | Total thickness [μm] "R" | | Thickness of magnetic layer [μm] "S" | | Thickness of back coating layer [μm] "T" | | Young's modulus of back coating layer [GN/m²] "U" | | "P" |
|---|---|---|---|---|---|---|---|---|---|---|---|---|
| Comp. example 210 | o | 17.2 | 7.8 | o | 11.0 | o | 1.5 | x | 0.7 | o | 22.5 | x |
| Comp. example 211 | o | 17.2 | 7.8 | o | 11.3 | o | 1.3 | o | 1.5 | x | 8.5 | x |
| Comp. example 212 | o | 17.2 | 7.8 | o | 12.3 | o | 1.5 | x | 3.0 | o | 20.1 | x |
| Comp. example 213 | o | 17.2 | 7.8 | o | 11.5 | o | 1.5 | o | 1.5 | x | 40.1 | x |
| Comp. example 214 | x | 19.8 | 3.9 | o | 11.0 | o | 2.0 | x | 1.0 | o | 20 | x |
| Comp. example 215 | o | 15.6 | 9.8 | x | 8.0 | o | 1.3 | x | 1.0 | o | 20 | x |
| Comp. example 216 | o | 17.2 | 7.8 | o | 11.0 | x | 1.0 | x | 1.0 | o | 20.5 | x |
| Comp. example 217 | o | 17.2 | 7.8 | o | 11.0 | x | 2.5 | x | 1.0 | o | 21 | x |

In addition thereto, with respect to an evaluation result of each embodiment and each comparative example shown in Table 11, each magnetic tape of the embodiments 201 through 207 and the comparative examples 201 through 217 is judged whether or not a magnetic tape satisfies each of conditions "V" through "Z" mentioned below. Table 13 exhibits a result of judgement by a circle mark "o" and a cross mark "x". In Table 13, the circle mark "o" represents that a magnetic tape satisfies a condition and the cross mark "x" represents that the magnetic tape does not satisfy the condition.

Condition "V": an error rate shall be less than $1.1 \times 10^{-5}$ or 1.1E-05.

Condition "W": a microscopic D/O (−6 dB, 0.5 μs) shall be less than 95 pieces.

Condition "X": edge damage according to the evaluation standard mentioned above shall be marked by the circle mark "o".

Condition "Y": an audio output shall be more than −0.8 dB.

Condition "Z": an RF output shall be more than −0.4 dB.

Each of the conditions "V" through "Z" is corresponding to the evaluation standard mentioned above unless otherwise specified.

TABLE 13

| Magnetic tape | Error rate V | | Microscopic D/O −6 dB, 0.5 μs (pcs.) W | | Edge damage X | | Audio output [dB] Y | | RF output [dB] Z | |
|---|---|---|---|---|---|---|---|---|---|---|
| Embodiment 201 | o | 9.6E−06 | o | 90 | o | o | −0.3 | o | 0.0 | |
| Embodiment 202 | o | 1.1E−05 | o | 95 | o | o | −0.6 | o | −0.2 | |
| Embodiment 203 | o | 3.0E−06 | o | 60 | o | o | −0.8 | o | −0.4 | |
| Embodiment 204 | o | 2.0E−06 | o | 43 | o | o | −0.3 | o | +0.2 | |
| Embodiment 205 | o | 2.0E−06 | o | 50 | o | o | −0.2 | o | 0 | |
| Embodiment 206 | o | 2.0E−06 | o | 33 | o | o | −0.3 | o | +0.2 | |
| Embodiment 207 | o | 2.0E−06 | o | 29 | o | o | −0.1 | o | +0.3 | |
| Comp. example 201 | x | 1.1E−04 | x | 280 | Δ | x | −1.2 | x | −1.1 | |
| Comp. example 202 | x | 1.4E−04 | x | 510 | o | x | −1.0 | x | −1.0 | |
| Comp. example 203 | x | 1.0E−04 | x | 300 | o | x | −1.0 | x | −0.8 | |
| Comp. example 204 | x | 1.8E−04 | x | 430 | Δ | x | −1.5 | x | −0.9 | |
| Comp. example 205 | x | 5.0E−04 | x | 790 | Δ | x | −1.9 | x | −1.6 | |
| Comp. example 206 | x | 1.0E−03 | x | 1050 | x | x | −2.4 | x | −2.2 | |
| Comp. example 207 | x | 1.4E−05 | x | 100 | o | o | −0.2 | o | 0.0 | |
| Comp. example 208 | x | 2.2E−05 | x | 160 | o | x | −0.9 | x | −0.5 | |
| Comp. example 209 | x | 3.0E−05 | x | 125 | o | o | −0.4 | o | −0.4 | |
| Comp. example 210 | x | 1.0E−04 | x | 290 | Δ | x | −2.5 | x | −1.3 | |
| Comp. example 211 | x | 2.0E−04 | x | 620 | Δ | x | −1.1 | x | −1.1 | |
| Comp. example 212 | x | 1.0E−04 | x | 410 | o | o | −0.1 | x | −0.7 | |
| Comp. example 213 | x | 1.0E−02 | x | 2050 | x | x | −1.0 | x | −3.0 | |
| Comp. example 214 | x | 1.0E−03 | x | 1350 | x | x | −1.2 | x | −2.1 | |
| Comp. example 215 | x | 1.0E−02 | x | 4100 | x | x | −2.8 | x | −3.5 | |
| Comp. example 216 | x | 8.3E−05 | x | 170 | Δ | x | −1.3 | x | −1.2 | |
| Comp. example 217 | x | 5.0E−04 | x | 820 | Δ | x | −1.5 | x | −2.0 | |

As mentioned above, by comparing Table 12 for making clear a constitutional difference between each of the embodiments 201 through 207 and each of the comparative examples 201 through 217 and Table 13 for making clear a evaluation difference between each of the embodiments 201 through 207 and each of the comparative examples 201 through 217, it is apparent that following result can be obtained, wherein each of the embodiments 201 through 207 and the comparative examples 201 through 217 is generically referred to as a sample.

Result 1: all samples satisfying the condition "P" satisfy the condition "V" totally.

Result 2: all samples satisfying the condition "P" satisfy the condition "W" totally.

Result 3: all samples satisfying the condition "P" satisfy the condition "X" totally.

Result 4: all samples satisfying the condition "P" satisfy the condition "Y" totally.

Result 5: all samples satisfying the condition "P" satisfy the condition "Z" totally.

Result 6: all samples not satisfying the condition "P" do not satisfy the condition "V".

Result 7: all samples not satisfying the condition "P" do not satisfy the condition "W".

As it is easily understood from the above-mentioned Results 1 through 7, a configuration satisfying the condition "P", which is a logical product of all the conditions "Q" through "T" and "U", can realize a magnetic tape having performances satisfying all the conditions "V" through "Z". In other words, by constituting such that a TD Young's modulus of non-magnetic substrate is within a range of more than 15.6 $GN/m^2$ and less than 19.6 $GN/m^2$, a total thickness of magnetic tape is within a range of more than 9.0 μm and less than 12.3 μm, a thickness of magnetic layer is within a range of more than 1.3 μm and less than 2.0 μm, a thickness of back coating layer is within a range of more than 1.1 μm and less than 2.5 μm and a MD Young's modulus is within a range of more than 11 $GN/m^2$ and less than 38 $GN/m^2$, a magnetic tape having certain values, which satisfy all the requirements for an error rate, microscopic D/O, edge damage, audio output and RF output, can be realized.

On the other hand, a magnetic tape satisfying each evaluation mentioned above can hardly obtained by constituting a configuration of which a condition is satisfied by just single item such as an error rate, for example, other than a configuration satisfying the condition "P". It is caused by that although a sample satisfying the condition "Q", for example, includes the comparative examples 207 through 213 and 215 through 217 as well as the embodiments 201 through 207 as shown in Table 12, each sample of the comparative examples 207 through 213 and 215 through 217 do not satisfy the conditions "V" and "W" as same situation as the other comparative examples and further they do not satisfy some of the conditions other than "V" and "W" as shown in Table 13. This is exactly the same situation as for conditions other than "Q".

An aspect of the present invention is to provide a magnetic tape having a satisfactory performance, which can not be obtained by paying attention to only an individual physical value in the past. According to the present invention, by selecting and combining a plurality of physical quantities, and by finding the above-mentioned numerical conditions with respect to each of the physical quantities, a thinner magnetic tape improved in head contact and edge damage, which is utilized for recording and reproducing a digital signal, can be realized.

Further, points of consideration, which are another aspect being apparent from Table 12 and equal to explaining the characteristic configuration of the present invention qualitatively, is as follows: the magnetic tapes according to the comparative examples 201 through 203 are scattered in edge damage, wherein the TD Young's modulus of non-magnetic substrate of the comparative examples 201 through 203 is inferior to the predetermined value with respect to the magnetic tapes according to the embodiments 201 through 207 of the present invention. However, the error rate and microscopic D/O of the comparative examples 201 through 203 are definitely inferior to those of the embodiments 201 through 207. Furthermore, the RF output of the comparative examples 201 through 203 is rather lower than that of the embodiments 201 through 207. Consequently, the magnetic tapes according to the comparative examples 201 through 203 are defective in a head contact, so that they must be improved.

With respect to the magnetic tapes according to the comparative examples 204 and 205, their TD Young's moduli of non-magnetic substrates are similar to each other but their MD Young's moduli are completely different from each other. Edge damage occurs and an excellent result can not be obtained. Consequently, it is known that an effect of improvement by changing a MD Young's modulus is relatively low.

The TD and MD Young's moduli of the comparative example 206 are set to approximately the same value to each other although they are relatively low. The magnetic tape according to the comparative example 206 is defective in the error rate and edge damage. This exhibits that the head contact and the tape strength are extremely deteriorated. Consequently, it is known that a noticeable improvement can not be obtained by a configuration, which designate TD and MD Young's moduli in a similar value simply.

With respect to the comparative examples 207 through 209, 211 and 213, the TD Young's modulus of non-magnetic substrate is within the range of the condition "Q". However, the Young's modulus of the back coating layer is out of the limit of the condition "U". Therefor, the error rate and microscopic D/O is deteriorated.

Particularly, the comparative example 213 of which Young's modulus of back coating layer is extremely high is deteriorated in the error rate, microscopic D/O, edge damage and RF output remarkably. This is caused by that the magnetic tape fails to keep its flexibility and excellent head contact, and finally the magnetic tape can not follow a tape running path of hardware such as a recording and reproducing apparatus.

In a case of the comparative examples 210 and 212 of which the thickness of the back coating layer is out of the limit of the condition "T", the error rate and microscopic D/O is deteriorated. In a case of the comparative example 210 of which the thickness of the back coating layer is thinner than the limit, the edge damage and audio output is also deteriorated due to insufficient tape strength.

In a case of the comparative example 214, the TD Young's modulus of the non-magnetic substrate is too high, so that the edge damage occurs and the head contact is deteriorated. Consequently, an audio output and RF output is deteriorated. In a case of the comparative example 215, the total thickness is thinner than 9.0 μm. Therefore, enough tape strength can not be obtained and the head contact is deteriorated. Accordingly, the error rate, microscopic D/O, edge damage, audio output and RF output is deteriorated. In a case of the comparative examples 216 and 217, the thickness of the magnetic layer is out of the limit of the condition "S", so that the characteristic is deteriorated.

In a case of the magnetic tapes according to the embodiments 201 through 207 of the present invention in comparison with each comparative example mentioned above, the RF output, the error rate and the microscopic D/O necessary to a digital recording medium exhibits an excellent result. Therefore, it is known that the head contact is excellent. Further, the edge damage and the audio output, which is an evaluation item related to tape strength, also exhibits an excellent result. According to the magnetic tapes of the embodiments 201 through 207, a thinner magnetic tape of which the total thickness is within the range of more than 9.0 µm and less than 12.3 µm can be prevented from tape damage possibly receiving while running and exhibits an excellent practical effect such that an excellent characteristic in an error rate as a digital recording medium and microscopic D/O of −6 dB and 0.5 µs can be obtained even though the magnetic tape is constituted as a thinner magnetic tape so as to cope with a recording for a longer period of time such that the thickness of the magnetic layer is within the range of more than 1.3 µm and less than 2.0 µm and the TD Young's modulus of the non-magnetic substrate is within the range of more than 15.6 $GN/m^2$ and less than 19.6 $GN/m^2$.

Furthermore, with respect to the back coating layer, by adjusting its thickness to be within a range of 1.1 to 2.5 µm and its MD Young's modulus to be within a range of 11 to 38 $GN/m^2$ and combining the back coating layer with the non-magnetic substrate mentioned above, the head contact and tape damage is greatly improved. Moreover, using plate shaped powder for the back coating layer and selecting resin can improve the back coating layer and a Young's modulus, which is a dynamical strength of magnetic tape totally.

According to an aspect of the present invention, there provided a magnetic tape as a magnetic recording medium, which exhibits excellent characteristics. By constituting the magnetic tape such that a total thickness of the magnetic tape is within a range of more than 9.0 µm and less than 12.3 µm, a thickness of magnetic layer is within a range of more than 1.3 µm and less than 2.0 µm and a TD Young's modulus of non-magnetic substrate is within a range of more than 15.6 $GN/m^2$ and less than 19.6 $GN/m^2$, receiving tape damage while running can be reduced even though a total thickness of the magnetic tape is thinner than the standard in order to realize a recording for a longer period of time. By maintaining a contact of the magnetic tape with a magnetic head in an excellent condition, the magnetic tape exhibits an excellent electromagnetic conversion characteristic. Further, an error rate and a microscopic D/O is reduced while recording and reproducing a digital signal.

What is claimed is:

1. A magnetic recording medium comprising:
   a tape shaped non-magnetic substrate; and
   a magnetic layer formed by coating magnetic powder and resin mixed and dispersed on one surface of said non-magnetic substrate,
   said magnetic recording medium is further characterized in that a total thickness of said magnetic recording medium is within a range of more than 9.0 µm and less than 12.3 µm, and that a thickness of said magnetic layer is within a range of more than 1.3 µm and less than 2.0 µm, and that a Young's modulus in the traverse direction (TD) of said non-magnetic substrate is within a range of more than 15.6 $GN/m^2$ and less than 19.6 $GN/m^2$.

2. The magnetic recording medium in accordance with claim 1, wherein another surface of said non-magnetic substrate is formed with a back coating layer, said back coating layer further including plate shaped powder.

3. The magnetic recording medium in accordance with claim 1, wherein another surface of said non-magnetic substrate is formed with a back coating layer of non-magnetic powder and resin mixed and dispersed,
   said back coating layer is further characterized in that a thickness of said back coating layer is within a range of more than 1.1 µm and less than 2.5 µm, and that a Young's modulus in the longitudinal direction (MD) of said back coating layer is within a range of more than 11 $GN/m^2$ and less than 38 $GN/m^2$.

4. The magnetic recording medium in accordance with claim 3, wherein said non-magnetic powder included in said back coating layer further includes plate shaped powder.

5. The magnetic recording medium in accordance with claim 3, wherein said resin included in said back coating layer further includes nitrocellulose, vinyl chloride copolymer and polyurethane resin.

* * * * *